(12) United States Patent
Chen et al.

(10) Patent No.: US 10,428,504 B2
(45) Date of Patent: Oct. 1, 2019

(54) ELECTRONIC TOILET SWITCHABLE BETWEEN COLD WATER AND HOT WATER AND METHOD OF CONTROLLING SAME

(71) Applicant: HANYU GROUP JOINT-STOCK CO., LTD., Guangdong (CN)

(72) Inventors: Shuping Chen, Guangdong (CN); Huashan Shi, Guangdong (CN); Yong Luo, Guangdong (CN)

(73) Assignee: HANYU GROUP JOINT-STOCK CO., LTD., Jiangmen, Guangdong (CN)

( * ) Notice: Subject to any disclaimer, the term of this patent is extended or adjusted under 35 U.S.C. 154(b) by 0 days.

(21) Appl. No.: 15/576,503

(22) PCT Filed: May 26, 2016

(86) PCT No.: PCT/CN2016/083408
§ 371 (c)(1),
(2) Date: Nov. 30, 2017

(87) PCT Pub. No.: WO2016/188440
PCT Pub. Date: Dec. 1, 2016

(65) Prior Publication Data
US 2018/0171614 A1 Jun. 21, 2018

(30) Foreign Application Priority Data
May 26, 2015 (CN) .................... 2015 2 0344987 U (51) Int. Cl.
*E03D 9/08* (2006.01)
*F24H 1/20* (2006.01)
(Continued)

(52) U.S. Cl.
CPC .............. *E03D 9/08* (2013.01); *F24H 1/207* (2013.01); *F24H 9/1809* (2013.01);
(Continued)

(58) Field of Classification Search
CPC ........... E03D 9/08; A47L 4/00; F16K 31/0675
(Continued)

(56) References Cited

U.S. PATENT DOCUMENTS

| 7,120,946 | B1 | 10/2006 | Lazar | |
| 2004/0060107 | A1* | 4/2004 | Eisenberg | A47K 7/046 4/605 |
| 2011/0179564 | A1 | 7/2011 | Yao | |

FOREIGN PATENT DOCUMENTS

| CN | 201206919 | 3/2009 |
| CN | 102650143 | 8/2012 |

(Continued)

*Primary Examiner* — Lori L Baker
(74) *Attorney, Agent, or Firm* — Boyle Fredrickson S.C.

(57) ABSTRACT

An electronic toilet and method of controlling the same. The electronic toilet includes a controller, a water spraying cleaner, a water chiller having a cold-water outlet pipe and a cold-water electromagnetic valve disposed on the cold-water outlet pipe, a water heater having a hot-water outlet pipe and a hot-water electromagnetic valve disposed on the hot-water outlet pipe, and a booster water pump. A water inlet of the booster water pump is connected to a confluent water outlet pipe of the water chiller through a water outlet pipe of the cold-water electromagnetic valve and the water heater through a water outlet pipe of the hot-water electromagnetic valve. A water outlet of the booster water pump is connected to the water spraying cleaner.

19 Claims, 3 Drawing Sheets

(51) Int. Cl.
*F24H 9/20* (2006.01)
*F24H 9/18* (2006.01)
*A47L 4/00* (2006.01)
*F16K 31/06* (2006.01)

(52) U.S. Cl.
CPC .............. *F24H 9/2007* (2013.01); *A47L 4/00* (2013.01); *F16K 31/0675* (2013.01)

(58) Field of Classification Search
USPC .......................................... 4/419–420.1, 491
See application file for complete search history.

(56) References Cited

FOREIGN PATENT DOCUMENTS

| | | |
|---|---|---|
| CN | 204690884 | 10/2015 |
| JP | 2001061705 | 3/2001 |

\* cited by examiner

ELECTRONIC TOILET SWITCHABLE BETWEEN COLD WATER AND HOT WATER AND METHOD OF CONTROLLING SAME

TECHNICAL FIELD

The present invention belongs to the technical field of electronic toilets, and more particularly to an electronic toilet for treating hemorrhoids and a method of controlling the same.

BACKGROUND

An existing electronic toilet can achieve rectum flushing, anus cleaning and flushing for female, and water discharged therefrom is supplied from a hot-water tank. The hot-water tank forms a circulating water way together with a circulating water pump and a seat, and the temperature of the flushing water is achieved by controlling the work of a heating tube of the hot-water tank. When the water temperature is adjusted from a high degree to a low degree by a user, such a temperature reduction can be achieved by the system only after discharging high-temperature hot-water in the hot-water tank through a spray bar first and then replenishing cold-water, or after natural cooling of the water in the hot-water tank. Both methods cannot realize rapid reduction of the water temperature.

SUMMARY OF THE INVENTION

A first objective of the present invention is to provide an electronic toilet switchable between cold-water and hot-water.

A second objective of the present invention is to provide a method of controlling an electronic toilet switchable between cold-water and hot-water.

An embodiment of the present invention provides an electronic toilet switchable between cold-water and hot-water, which includes: a controller, a water spraying cleaner, a water chiller having a cold-water outlet pipe and a cold-water electromagnetic valve disposed on the cold-water outlet pipe; a water heater having a hot-water outlet pipe and a hot-water electromagnetic valve disposed on the hot-water outlet pipe; and a booster water pump, having a water inlet connected to a confluent water outlet pipe which is formed by the cold-water outlet pipe through the cold-water electromagnetic valve of the water chiller joining to the hot-water outlet pipe through the hot-water electromagnetic valve of the water heater, and a water outlet connected to the water spraying cleaner.

Preferably, the water chiller also includes: a cold-water tank; a semiconductor chilling plate with a chilling surface thereof installed within the cold-water tank; a radiating fin installed within the cold-water tank and pressed against the chilling surface of the semiconductor chilling plate; a water level switch installed within the cold-water tank; and a temperature sensor installed within the cold-water tank.

Preferably, a radiating surface of the semiconductor chilling plate is communicated with a pipe of the water heater through a cold-water joint so as to heat water in the water heater.

Preferably, the water heater also includes: a hot-water tank; a heating tube installed in the hot-water tank; a water level switch installed within the hot-water tank; and a temperature sensor installed within the hot-water tank.

Preferably, a heat sink is disposed between the hot-water tank and a pipe connected with the seat having a water receiving cavity, and the heat sink includes a radiator and a fan.

The pipe connection of the above electronic toile is as follows: a main water inlet pipe is divided into two branches after passing through a tee joint. One branch enters the cold-water tank after passing through a water inlet valve. A pipe is connected to the electromagnetic valve after passing through the water outlet of the cold-water tank, and finally joins a hot-water pipe to be connected to the water spraying cleaner. The other branch enters the hot-water tank through a water inlet valve. A pipe is connected to a circulating water pump through a circulating water outlet of the hot-water tank. After passing through the circulating water pump, the pipe is connected to the cold-water joint. After passing through the cold-water joint, the pipe is communicated with the seat, and the pipe is communicated with the radiator through the water outlet of the seat. Through the outlet of the radiator, the pipe is communicated with the circulating water inlet of the hot-water tank. This process results in a water heating seat loop. A water inlet for the water spraying cleaner is also provided in the hot-water tank. A pipe is communicated with the electromagnetic valve after passing through the water inlet for the water spraying cleaner. The pipe passing through the electromagnetic valve joins the cold-water pipe through a tee joint, and the confluent pipe is connected to the water spraying cleaner after passing through the booster water pump.

In another aspect, an embodiment of the present invention provides a method of controlling an electronic toilet switchable between cold-water and hot-water. The electronic toilet includes: a controller, a water spraying cleaner; a water chiller having a cold-water outlet pipe and a cold-water electromagnetic valve disposed on the cold-water outlet pipe; a water heater having a hot-water outlet pipe and a hot-water electromagnetic valve disposed on the hot-water outlet pipe; and a booster water pump having a water inlet connected to a confluent water outlet pipe which is formed by the cold-water outlet pipe through the cold-water electromagnetic valve of the water chiller joining to the hot-water outlet pipe through the hot-water electromagnetic valve of the water heater, and a water outlet connected to the water spraying cleaner.

The method includes the following steps: opening, by the controller, the cold-water electromagnetic valve and obtaining a temperature of cold-water in the water chiller when receiving an anus cleaning instruction from a user, determining, by the controller, pressure boosting operation time for the booster water pump and stopping time for the booster water pump according to the obtained temperature of cold-water; controlling, by the controller, the booster water pump to perform a pressure boosting operation according to the determined pressure boosting operation time for the booster water pump such that the cold-water in the water chiller is sprayed via the water spraying cleaner; and stopping, by the controller, the pressure boosting operation of the booster water pump after the pressure boosting operation time for the booster water pump expires, thereby preventing cold-water or hot-water from being sprayed via the water spraying cleaner in the stopping time for the booster water pump.

Preferably, the step of determining, by the controller, the pressure boosting operation time for the booster water pump and the stopping time for the booster water pump according to the obtained temperature of cold-water includes: obtaining, by the controller, the temperature of cold-water according to a detection signal from a temperature sensor of the water chiller; and determining, by the controller, the pressure boosting operation time for the booster water pump and the stopping time for the booster water pump that correspond to the temperature of cold-water by looking up a prestored correspondence list containing a correspondence of temperatures of water, pressure boosting operation time for the booster water pump and stopping time for the booster water pump.

Preferably, the pressure boosting operation time for the booster water pump and the stopping time for the booster water pump are less with lower temperature of cold-water.

Preferably, the temperature of cold-water is greater than or equal to 0° C. and less than or equal to 43° C.

Preferably, the correspondence of temperatures of water, pressure boosting operation time for the booster water pump and stopping time for the booster water pump in the correspondence list includes:

| Temperature of Cold-water (° C.) | Pressure boosting operation Time for Booster water pump (S) | Stopping time for Booster water pump (S) |
| --- | --- | --- |
| 0-7.9 | 5 ± 10% | 2 ± 10% |
| 8-9.9 | 6 ± 10% | 3 ± 10% |
| 10-11.9 | 7 ± 10% | 4 ± 10% |
| 12-13.9 | 8 ± 10% | 5 ± 10% |
| 14-15.9 | 9 ± 10% | 5 ± 10% |
| 16-17.9 | 10 ± 10% | 5 ± 10% |
| 18-43 | 15 ± 10% | 5 ± 10% |

Additionally, an embodiment of the present invention also provides another method of controlling an electronic toilet switchable between cold-water and hot-water. The electronic toilet includes: a controller; a water spraying cleaner; a water chiller having a cold-water outlet pipe and a cold-water electromagnetic valve disposed on the cold-water outlet pipe; a water heater having a hot-water outlet pipe and a hot-water electromagnetic valve disposed on the hot-water outlet pipe; and a booster water pump having a water inlet connected to a confluent water outlet pipe which is formed by the cold-water outlet pipe through the cold-water electromagnetic valve of the water chiller joining to the hot-water outlet pipe through the hot-water electromagnetic valve of the water heater, and a water outlet connected to the water spraying cleaner.

The method includes: enabling, by the controller, the booster water pump to perform a pressure boosting operation when receiving an anus cleaning instruction from a user, alternately opening or closing, by the controller, the cold-water electromagnetic valve or the hot-water electromagnetic valve during the pressure boosting operation of the booster water pump such that cold-water in the water chiller and hot-water in the water heater are alternately sprayed via the water spraying cleaner, and stopping, by the controller, the pressure boosting operation of the booster water pump after alternately opening or closing the cold-water electromagnetic valve and the hot-water electromagnetic valve a number of times.

Preferably, the step of enabling, by the controller, the booster water pump to perform the pressure boosting operation when receiving the anus cleaning instruction from a user includes: opening, by the controller, the cold-water electromagnetic valve and controlling the cleaner to stretch out according to the anus cleaning instruction; and enabling, by the controller, the booster water pump to perform the pressure boosting operation after the cleaner stretches out such that the cold-water in the water chiller is sprayed via the water spraying cleaner.

Preferably, the controller alternately opens or closes the cold-water electromagnetic valve and the hot-water electromagnetic valve during the pressure boosting operation of the booster water pump, which specifically includes: starting, by the controller, a timer for timing when the cold-water in the water chiller is sprayed via the water spraying cleaner, by the controller, according to timing expiration information of the timer, closing the cold-water electromagnetic valve and opening the hot-water electromagnetic valve such that hot-water in the water heater is sprayed via the water spraying cleaner; and controlling, by the controller, to start the timer for timing again when the hot-water in the water heater is sprayed via the water spraying cleaner, and according to the timing expiration information of the timer, closing the hot-water electromagnetic valve and opening the cold-water electromagnetic valve so that the cold-water in the water chiller is sprayed via the water spraying cleaner, thereby allowing the cold-water in the water chiller and the hot-water in the water heater to be alternately sprayed via the water spraying cleaner.

In the above two methods, controller detects the temperature of cold-water in a cold-water tank by means of a temperature sensor installed in the cold-water tank, and controls a semiconductor chilling plate to chill the water in the cold-water tank according to a detection result.

Preferably, controlling the semiconductor chilling plate to chill the water in the cold-water tank according to the detection result includes: determining whether the detected temperature of cold-water is lower than a first temperature; stopping the semiconductor chilling plate from operating in the event of the temperature of cold-water below the first temperature; determining whether temperature of cold-water is higher than above a second temperature in the event of the temperature of cold-water above the first temperature; stopping the semiconductor chilling plate from operating in the event of the temperature of cold-water below the second temperature; and enabling the semiconductor chilling plate to operate in the event of the temperature of cold-water above the second temperature.

Preferably, the first temperature is 10±10% ° C.; and the second temperature is 12±10% ° C.

The present invention has the following advantages: 1) rapid switching between cold-water and hot-water can be achieved; 2) when cold-water or alternate cold and hot-water is utilized to clean the anus, the pain caused by hemorrhoids can be alleviated; 3) if the anus is cleaned by using cold-water or alternating cold and hot-water for a long time, a good treatment effect on the hemorrhoids can be produced.

DETAILED DESCRIPTION OF THE INVENTION

It is to be appreciated that "top", "bottom", "left", "right", "up", "down", "leftwards", "rightwards", etc., as used herein, are directional terms are descriptions with regard to non-limiting orientations indicated in the accompanying drawings. The terms "inward", "outward", "in", "out", "inside" and "outside" used herein refer to ranges relative to the center of a member, unless stated otherwise. For example, with reference to the axis of a motor, "in" and "inside" mean positions or orientations closer or pointing to the axis of the motor. "out" and "outside" mean being further away from the center position of the motor. In addition, the terms "horizontal", "vertical" and "overhanging" do not mean requiring absolute horizontal or overhanging of a member, which may slightly tilt. For example, "horizontal" just refers to that the direction is more horizontal relative to "vertical" and does not mean that the structure is to be fully horizontal, which, however, may slightly tilt.

Embodiment 1

Figure 1:
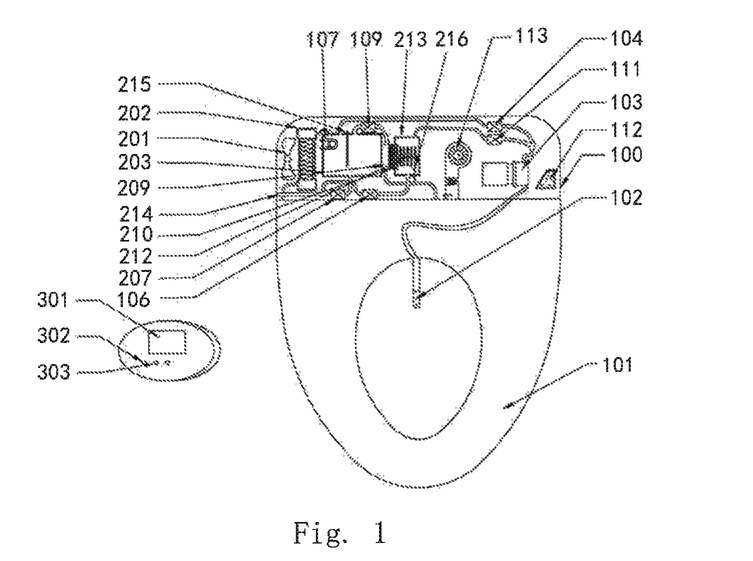
FIG. 1 is a schematic structure diagram of an internal water chiller of embodiment 1 of the present invention.

As shown in FIG. 1, an electronic toilet switchable between cold-water and hot-water includes a controller 112, a main body 100, a seat 101 in hinged connection with the main body, and a seat cover (not shown). The electronic toilet is provided with a water spraying cleaner 102, a water chiller and a water heater. An electronic valve 111 and an electronic valve 104 are mounted on water outlet pipes of the water chiller and the water heater, respectively. The water outlet pipe of the water chiller through the electronic valve 111 joins the water outlet pipe of the water heater through the electronic valve 104 by means of a tee joint 217. The confluent pipe is connected to the water spraying cleaner 102 through a booster water pump 103. The electronic toilet is switchable between cold-water and hot-water under the control of a wireless operator 301.

Figure 2:
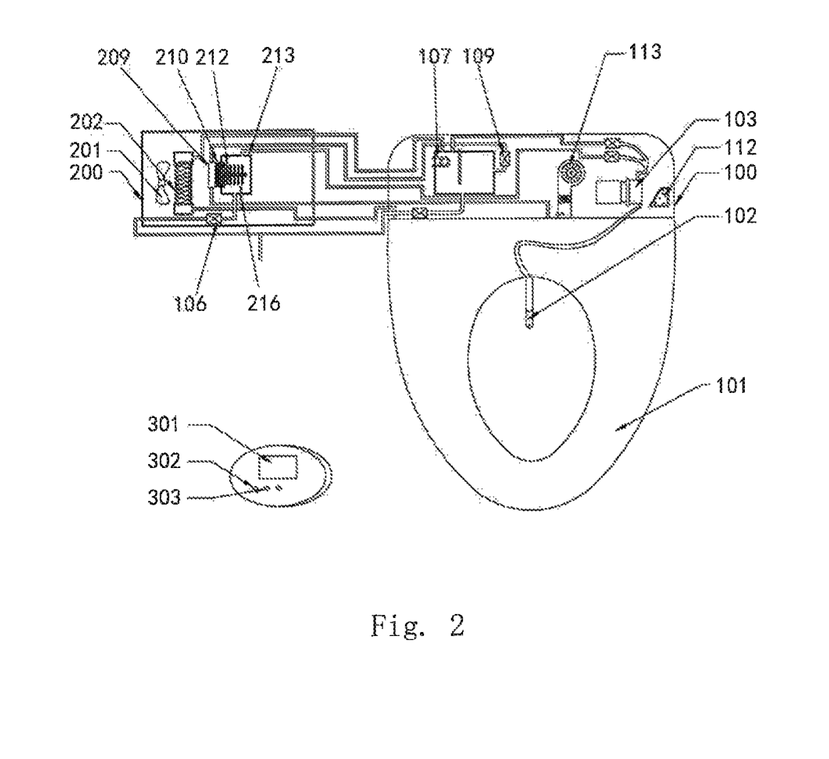
FIG. 2 is a schematic structure diagram of an external water chiller of embodiment 1 of the present invention.

FIG. 1 and FIG. 2 are two implementations of the chiller, where the chiller of FIG. 1 is disposed within the main body, and the chiller of FIG. 2 is disposed outside the main body.

Figure 4:
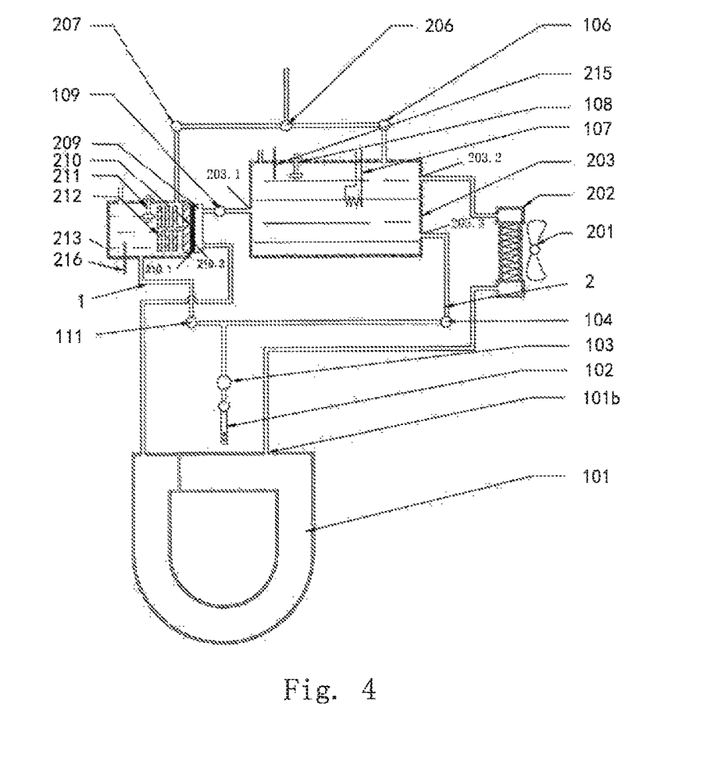
FIG. 4 is a pipe connection diagram of embodiment 1 of the present invention.

As shown in FIG. 4, the water chiller includes a cold-water tank 213, a semiconductor chilling plate 210, a radiating fin 212, a temperature sensor 216 and a water level switch 211. A chilling surface 210.1 of the semiconductor chilling plate 210 is installed within the cold-water tank 213. The radiating fin 212 is connected against the chilling surface 210.1 of the semiconductor chilling plate 210. The radiating fin 212 serves to expand the contact area of the chilling surface and water in the cold-water tank for rapid chilling. A radiating surface 210.2 of the semiconductor chilling plate 210 is connected to the water heater through a cold-water joint 209. The water level switch 211 and the temperature sensor 216 are installed within the cold-water tank 213. The water level switch 211 serves to control water replenishment to the cold-water tank 213. The temperature sensor 216 serves to detect the temperature in the cold-water tank 213. A program controller 112 controls the semiconductor chilling plate 210 to operate according to a detection signal from the temperature sensor 216.

As shown in FIG. 4, the water heater includes a hot-water tank, a heating tube 107, a temperature sensor 215 and a water level switch 108. The radiating surface 210.2 of the semiconductor chilling plate 210 of the water chiller is connected to the pipe of the water heater through the cold-water joint 209.

As shown in FIG. 4, the seat 101 has a water receiving cavity and a water inlet/outlet. A heat sink is disposed between the circulating water inlet 203.2 of the hot-water tank and a connecting pipe of the seat 101, and the heat sink includes a radiator 202 and a fan 201. Two ports are provided on the radiator 202, one port connected with the seat 101 and the other port connected with the hot-water tank. Also provided on the external surface of the radiator 202 is the fan 201. When the semiconductor chilling plate 210 starts chilling to bring the temperature in the hot-water tank 203 to a set temperature, the fan 201 is activated, and the heat sink may rapidly take away the heat from the radiating surface 210.2 of the semiconductor chilling plate, thereby increasing the chilling speed.

As shown in FIG. 4, the pipe connection of the electronic toilet switchable between cold-water and hot-water is as follows: a main water inlet pipe is divided into two branches through a tee joint 206. One branch enters the cold-water tank 213 after passing through a water inlet valve 207; a pipe is connected to the electromagnetic valve 111 after passing through the water outlet of the cold-water tank 213. The pipe through the electromagnetic valve 111 joins the hot-water pipe through the tee joint 217. The confluent pipe then passes through the booster water pump 103 and is finally connected to the water spraying cleaner 102. The other branch enters the hot-water tank 203 after passing through a water inlet valve 106. The hot-water tank is provided with a circulating water outlet 203.1, a circulating water inlet 203.2 and a water inlet 203.3 for the water spraying cleaner. A pipe is connected to a circulating water pump 109 through the circulating water outlet 203.1 of the hot-water tank. The pipe is connected to the cold-water joint 209 through the circulating water pump 109. After passing through the cold-water joint 209, the pipe is communicated with the seat 101, and then the pipe communicates the water outlet 101b of the seat 101 with the radiator 202. After passing through the radiator 202, the pipe is connected to the circulating water inlet 203.2. This process results in a circulating loop of the heat seat. The pipe is then led out from the water inlet 203.3 for the water spraying cleaner in the hot-water tank 203 to communicate the electromagnetic valve 104 with the hot-water tank 203. The pipe through the electromagnetic valve 104 joins the cold-water pipe through the tee joint 217, and the confluent pipe then passes through the booster water pump 103 and is finally connected to the water spraying cleaner 102.

In the working process, when the hot-water tank 203 and the cold-water tank 213 are both below set temperatures, the water in the hot-water tank comes into contact with the radiating surface 210.2 of the semiconductor chilling plate after passing through the circulating water outlet 203.1 and the cold-water joint 209. The water in the hot-water tank can be heated by using the heat from the radiating surface 210.2 of the semiconductor chilling plate 210, and meanwhile, the water flowing from the radiating surface 210.2 of the semi-conductor chilling plate will take away the heat of the radiating surface 210.2, thereby increasing the chilling speed of the cold-water tank 213. When the hot-water tank 203 is at the set temperature and the cold-water tank 213 is below the set temperature, the fan 201 is activated, and the radiator 202 in the circulation loop of the water heating seat rapidly takes away the heat generated by the radiating surface 210.2 of the semiconductor chilling plate, allowing rapid chilling. In this process, the heat dissipated by the heat sink is more than the heat generated by the semiconductor chilling plate 201.

As shown in FIG. 1 and FIG. 2, the wireless operator 301 is provided with two function keys: a cold-water key 303 for controlling spraying of cold-water and a cold/hot-water key 302 for controlling alternate spraying of cold-water and hot-water. When the cold-water key 303 of the wireless operator 301 is pressed down, the electromagnetic valve 104 is closed and the electromagnetic valve 111 is opened allowing cold-water to be sprayed from the water spraying cleaning device 102. When the cold/hot-water key 302 is pressed down, step 1 is performed first: opening the electromagnetic valve 111 and closing the electromagnetic valve 104; and then step 2 is performed: closing the electromagnetic valve 111 and opening the electromagnetic valve 104. Subsequently, circulating actions are carried out in accordance with step 1 and step 2 to realize alternating of hot-water and cold-water, allowing cold-water and hot-water to be alternately sprayed from the water spraying cleaning device 102. If the anus is cleaned by using cold-water or alternately cleaned by using cold-water and hot-water for a long time, a good treatment effect on the hemorrhoids can be produced.

Embodiment 2

Figure 3:
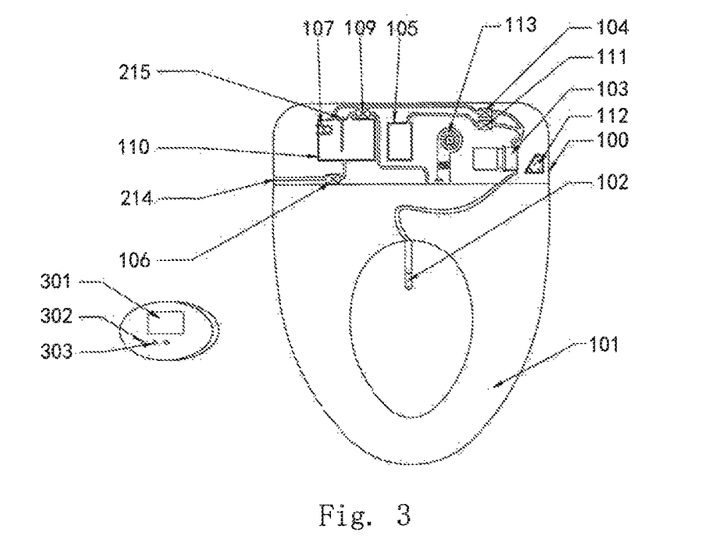
FIG. 3 is a schematic structure diagram of embodiment 2 of the present invention.
Figure 5:
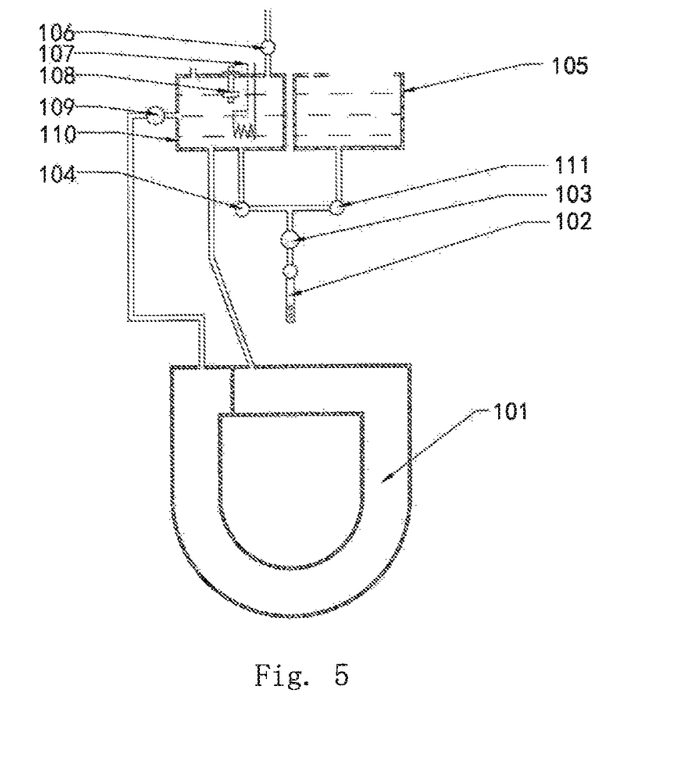
FIG. 5 is a pipe connection diagram of embodiment 2 of the present invention.

FIG. 3 and FIG. 5 are a structure diagram and a pipe connection diagram of embodiment 2 of the electronic toilet switchable between cold-water and hot-water. Compared to embodiment 1, water tank 105 is a cavity communicating with the outside of the main body, and such electronic elements of chilling, water level, temperature sensing and the like are not needed within the water tank. When a user needs cold-water for cleaning, cold-water is injected into the water tank 105 in advance.

In another aspect, an embodiment of the present invention also provides a method of controlling the electronic toilet to be switchable between cold-water and hot-water as described above. The method includes the following steps: opening the cold-water electromagnetic valve and obtaining a temperature of cold-water in the water chiller by the controller when receiving an anus cleaning instruction from a user; determining, by the controller, pressure boosting operation time for the booster water pump and stopping time for the booster water pump according to the obtained temperature of cold-water, controlling, by the controller, the booster water pump to perform a pressure boosting operation according to the determined pressure boosting operation time for the booster water pump such that the cold-water in the water chiller is sprayed via the water spraying cleaner, and stopping, by the controller, the pressure boosting operation of the booster water pump after the pressure boosting operation time for the booster water pump expires, thereby preventing cold-water or hot-water from being sprayed via the water spraying cleaner in the stopping time for the booster water pump.

In a particular period of time, by cleaning the anus with the cold-water, the anal muscle may be caused to contract in addition to cleaning of the anus, thereby allowing alleviation of the pain caused by the hemorrhoids.

The step of determining, by the controller, the pressure boosting operation time for the booster water pump and the stopping time for the booster water pump according to the obtained temperature of cold-water includes: obtaining, by the controller, the temperature of cold-water according to a detection signal from a temperature sensor of the water chiller, and determining, by the controller, the pressure boosting operation time for the booster water pump and the stopping time for the booster water pump that correspond to the temperature of cold-water by looking up a prestored correspondence list containing a correspondence of temperatures of water, pressure boosting operation time for the booster water pump and stopping time for the booster water pump.

Preferably, after controlling the booster water pump to perform the pressure boosting operation and to stop according to the pressure boosting operation time for the booster water pump and the stopping time for the booster water pump that correspond to the temperature of cold-water a number of times, the controller stops water supply from the cold-water pipe by controlling the booster water pump.

The inventor has found through practices that the lower the temperature of cold-water is, the shorter the time it takes for cleaning the anus with the cold-water, thereby arriving at a handling method which the lower the temperature of cold-water is, the shorter the pressure boosting operation time and the stopping time for the booster water pump take.

Additionally, the inventor also found that the temperature of cold-water should be higher than or equal to 0° C. and less than or equal to 43° C.

The inventor obtained from a lot of experiments the following correspondence of temperatures of water, pressure boosting operation time for the booster water pump and stopping time for the booster water pump in the correspondence list:

The inventor obtained from a lot of experiments the following correspondence of temperatures of water, pressure boosting operation time for the booster water pump and stopping time for the booster water pump in the correspondence list:

TABLE 1.1

| Temperature of Cold-water (° C.) | Pressure boosting operation Time for Booster water pump (S) | Stopping time for Booster water pump (S) |
| --- | --- | --- |
| 0-7.9 | 5 ± 10% | 2 ± 10% |
| 8-9.9 | 6 ± 10% | 3 ± 10% |
| 10-11.9 | 7 ± 10% | 4 ± 10% |
| 12-13.9 | 8 ± 10% | 5 ± 10% |
| 14-15.9 | 9 ± 10% | 5 ± 10% |
| 16-17.9 | 10 ± 10% | 5 ± 10% |
| 18-43 | 15 ± 10% | 5 ± 10% |

An embodiment of the present invention also provides a method of controlling the electronic toilet as described above. The method includes: enabling, by the controller, the booster water pump to perform a pressure boosting operation when receiving an anus cleaning instruction from a user, alternately opening or closing, by the controller, the cold-water electromagnetic valve or the hot-water electromagnetic valve during the pressure boosting operation of the booster water pump such that cold-water in the water chiller and hot-water in the water heater are alternately sprayed via the water spraying cleaner (the time of each spray is about 5 seconds); stopping, by the controller, the pressure boosting operation of the booster water pump after alternately opening or closing the cold-water electromagnetic valve and the hot-water electromagnetic valve a number of times (e.g., 5 times).

The step of enabling, by the controller, the booster water pump to perform the pressure boosting operation when receiving the anus cleaning instruction from a user includes: opening, by the controller, the cold-water electromagnetic valve and controlling the cleaner to stretch out according to the anus cleaning instruction; and enabling, by the controller, the booster water pump to perform the pressure boosting operation after the cleaner stretches out such that the cold-water in the water chiller is sprayed via the water spraying cleaner.

The controller alternately opens or closes the cold-water electromagnetic valve and the hot-water electromagnetic valve during the pressure boosting operation of the booster water pump, which specifically includes: starting, by the controller, a timer for timing when the cold-water in the water chiller is sprayed via the water spraying cleaner; by the controller, according to timing expiration information of the timer, closing the cold-water electromagnetic valve and opening the hot-water electromagnetic valve such that hot-water in the water heater is sprayed via the water spraying cleaner, by the controller, starting the timer for timing again when the hot-water in the water heater is sprayed via the water spraying cleaner, and according to the timing expiration information of the timer, closing the hot-water electromagnetic valve and opening the cold-water electromagnetic valve such that the cold-water in the water chiller is sprayed via the water spraying cleaner, thereby allowing the cold-water in the water chiller and the hot-water in the water heater to be alternately sprayed via the water spraying cleaner.

In the above two methods, controller detects the temperature of cold-water in a cold-water tank by means of a temperature sensor installed in the cold-water tank, and controls a semiconductor chilling plate to chill the water in the cold-water tank according to a detection result.

Controlling the semiconductor chilling plate to chill the water in the cold-water tank according to the detection result includes: determining whether the detected temperature of cold-water is lower than a first temperature; stopping the semiconductor chilling plate from operating in the event of the temperature of cold-water below the first temperature; determining whether temperature of cold-water is higher than a second temperature in the event of the temperature of cold-water above the first temperature; stopping the semiconductor chilling plate from operating in the event of the temperature of cold-water below the second temperature; and enabling the semiconductor chilling plate to operate in the event of the temperature of cold-water above the second temperature, where the first temperature is 10±10%° C.; and the second temperature is 12±10% ° C.

The invention claimed is:

1. An electronic toilet switchable between cold-water and hot-water for treating hemorrhoids, comprising: a controller and a water spraying cleaner, comprising:
   a water chiller, having a cold-water outlet pipe and a cold-water electromagnetic valve disposed on the cold-water outlet pipe;
   a water heater, having a hot-water outlet pipe and a hot-water electromagnetic valve disposed on the hot-water outlet pipe; and
   a booster water pump, having a water inlet connected to a confluent water outlet pipe which is formed by the cold-water outlet pipe through the cold-water electromagnetic valve of the water chiller joining to the hot-water outlet pipe through the hot-water electromagnetic valve of the water heater, and a water outlet connected to the water spraying cleaner.

2. The electronic toilet for treating hemorrhoids of claim 1, characterized in that the water chiller also comprises:
   a cold-water tank;
   a semiconductor chilling plate with a chilling surface thereof installed within the cold-water tank;
   a radiating fin installed within the cold-water tank and clinging to the chilling surface of the semiconductor chilling plate;
   a water level switch installed within the cold-water tank; and
   a temperature sensor installed within the cold-water tank.

3. The electronic toilet for treating hemorrhoids of claim 2, characterized in that a radiating surface of the semiconductor chilling plate is communicated with a pipe of the water heater through a cold-water joint so as to heat water in the water heater.

4. The electronic toilet for treating hemorrhoids of claim 2, characterized in that the water heater comprises:
   a hot-water tank;
   a heating tube installed within the hot-water tank;
   a temperature sensor installed within the hot-water tank; and
   a water level switch installed within the hot-water tank.

5. The electronic toilet for treating hemorrhoids of claim 2, characterized in that a heat sink is disposed between the hot-water tank and a pipe connected to a toilet seat having a water receiving cavity, and the heat sink comprises a radiator and a fan.

6. A method of controlling an electronic toilet to be switchable between cold-water and hot-water for treating hemorrhoids, the electronic toilet comprising:
   a controller;
   a water spraying cleaner;
   a water chiller, having a cold-water outlet pipe and a cold-water electromagnetic valve disposed on the cold-water outlet pipe;
   a water heater, having a hot-water outlet pipe and a hot-water electromagnetic valve disposed on the hot-water outlet pipe; and
   a booster water pump, having a water inlet connected to a confluent water outlet pipe which is formed by the cold-water outlet pipe through the cold-water electromagnetic valve of the water chiller joining to the hot-water outlet pipe through the hot-water electromagnetic valve of the water heater, and a water outlet connected to the water spraying cleaner;
   the method comprising the following steps:
      opening, by the controller, the cold-water electromagnetic valve and obtaining a temperature of cold-water in the water chiller when receiving an anus cleaning instruction from a user;
      determining, by the controller, pressure boosting operation time for the booster water pump and stopping time for the booster water pump according to the obtained temperature of cold-water;
      controlling, by the controller, the booster water pump to perform a pressure boosting operation according to the determined pressure boosting operation time for the booster water pump so that the cold-water in the water chiller is sprayed via the water spraying cleaner; and
      stopping, by the controller, the pressure boosting operation of the booster water pump according to the determined the stopping time for the booster water pump after the pressure boosting operation time for the booster water pump expires, thereby preventing cold-water or hot-water from being sprayed via the water spraying cleaner in the stopping time for the booster water pump.

7. The method of claim 6, wherein the step of determining, by the controller, the pressure boosting operation time for the booster water pump and the stopping time for the booster water pump according to the obtained temperature of cold-water comprises:
   obtaining, by the controller, the temperature of cold-water according to a detection signal from a temperature sensor of the water chiller; and
   determining, by the controller, the pressure boosting operation time and the stopping time of the booster water pump that correspond to the temperature of cold-water by looking up a prestored correspondence list containing a correspondence of temperatures of water to the pressure boosting operation time and the stopping time of the booster water pump.

8. The method of claim 6, wherein the lower temperature of cold-water is, the less the pressure boosting operation time and the stopping time of the booster water pump.

9. The method of claim 6, wherein the temperature of cold-water is greater than or equal to 0° C. and less than or equal to 43° C.

10. The method of claim 7, wherein the correspondence of temperatures of cold-water, the pressure boosting operation time and the stopping time of the booster water pump in the prestored correspondence list corresponds to TABLE 1.1.

11. A method of controlling an electronic toilet switchable between cold-water and hot-water for treating hemorrhoids, the electronic toilet comprising:
   a controller;
   a water spraying cleaner;
   a water chiller, having a cold-water outlet pipe and a cold-water electromagnetic valve disposed on the cold-water outlet pipe;
   a water heater, having a hot-water outlet pipe and a hot-water electromagnetic valve disposed on the hot-water outlet pipe; and
   a booster water pump, having a water inlet connected to a confluent water outlet pipe which is formed by the cold-water outlet pipe through the cold-water electromagnetic valve of the water chiller joining to the hot-water outlet pipe through the hot-water electromagnetic valve of the water heater, and a water outlet connected to the water spraying cleaner;
   the method comprising:
   enabling, by the controller, the booster water pump to perform a pressure boosting operation when receiving an anus cleaning instruction from a user;
   alternately opening or closing, by the controller, the cold-water electromagnetic valve or the hot-water electromagnetic valve during the pressure boosting operation of the booster water pump so that cold-water in the water chiller and hot-water in the water heater are alternately sprayed via the water spraying cleaner; and
      stopping, by the controller, the pressure boosting operation of the booster water pump after alternately opening or closing the cold-water electromagnetic valve and the hot-water electromagnetic valve for a number of times.

12. The method of claim 11, wherein the step of enabling, by the controller, the booster water pump to perform the pressure boosting operation when receiving the anus cleaning instruction from a user comprises:
   opening the cold-water electromagnetic valve and controlling the cleaner to stretch out by the controller according to the anus cleaning instruction; and
   enabling, by the controller, the booster water pump to perform the pressure boosting operation after the cleaner stretches out, so that the cold-water in the water chiller is sprayed via the water spraying cleaner.

13. The method of claim 11, wherein alternately opening or closing, by the controller, the hot-water electromagnetic valve and the cold-water electromagnetic valve during the pressure boosting operation of the booster water pump comprises:
   starting, by the controller, a timer for timing when the cold-water in the water chiller is sprayed via the water spraying cleaner;
   controlling, by the controller, to close the cold-water electromagnetic valve and open the hot-water electromagnetic valve according to timing expiration information of the timer, so that hot-water in the water heater is sprayed via the water spraying cleaner;
   controlling, by the controller, to start the timer for timing again when the hot-water in the water heater is sprayed via the water spraying cleaner, and according to the timing expiration information of the timer, to close the hot-water electromagnetic valve and opening the cold-water electromagnetic valve so that the cold-water in the water chiller is sprayed via the water spraying cleaner, thereby allowing the cold-water in the water chiller and the hot-water in the water heater to be alternately sprayed via the water spraying cleaner.

14. The method of claim 11, wherein the controller detects the temperature of cold-water in a cold-water tank by means of a temperature sensor installed in the cold-water tank, and controls a semiconductor chilling plate to chill the water in the cold-water tank according to a detection result.

15. The method of claim 14, wherein controlling the semiconductor chilling plate to chill the water in the cold-water tank according to the detection result comprises:
determining whether the detected temperature of cold-water is lower than a first temperature;
   stopping the semiconductor chilling plate from operating in the event of the temperature of cold-water below the first temperature;
   determining whether temperature of cold-water is higher than a second temperature in the event of the temperature of cold-water above the first temperature;
   stopping the semiconductor chilling plate from operating in the event of the temperature of cold-water below the second temperature; and
   enabling the semiconductor chilling plate to operate in the event of the temperature of cold-water above the second temperature.

16. The method of claim 15, wherein the first temperature is $10\pm10\%$ and the second temperature is $12\pm10\%$ ° C.

17. The method of claim 6, wherein the controller detects the temperature of cold-water in a cold-water tank by means of a temperature sensor installed in the cold-water tank, and controls a semiconductor chilling plate to chill the water in the cold-water tank according to a detection result.

18. The method of claim 17, wherein controlling the semiconductor chilling plate to chill the water in the cold-water tank according to the detection result comprises:
determining whether the detected temperature of cold-water is lower than a first temperature;
   stopping the semiconductor chilling plate from operating in the event of the temperature of cold-water below the first temperature;
   determining whether temperature of cold-water is higher than a second temperature in the event of the temperature of cold-water above the first temperature;
   stopping the semiconductor chilling plate from operating in the event of the temperature of cold-water below the second temperature; and
   enabling the semiconductor chilling plate to operate in the event of the temperature of cold-water above the second temperature.

19. The method of claim 18, wherein the first temperature is $10\pm10\%$ ° C.; and the second temperature is $12\pm10\%$ ° C.

* * * * *